No. 624,760. Patented May 9, 1899.
H. DERDEYN.
BELT FASTENER.
(Application filed June 4, 1898.)
(No Model.)
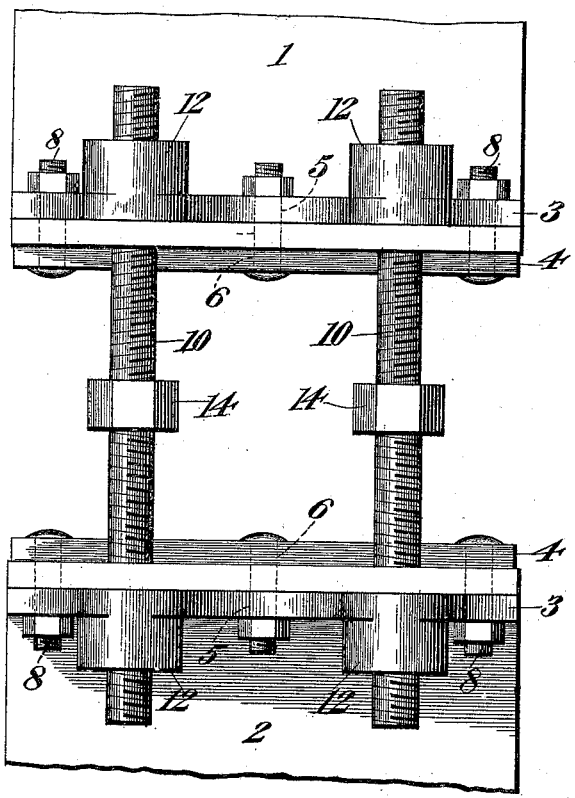
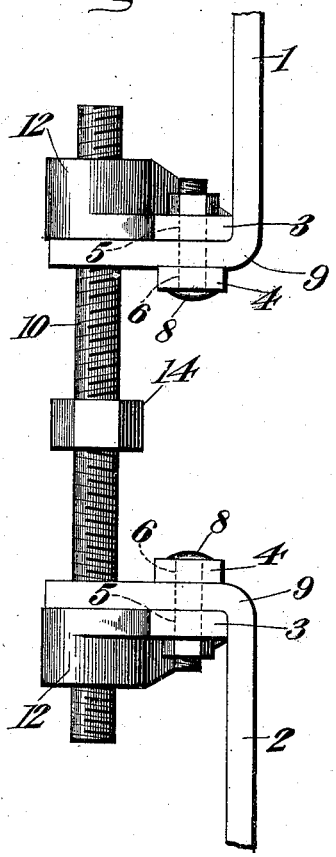
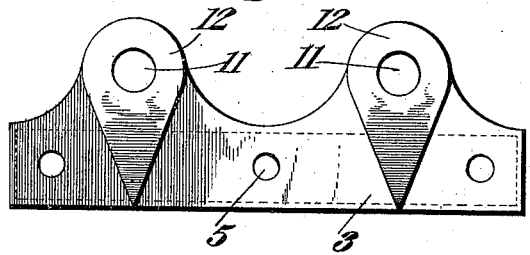
Witnesses
M. E. Fowler
Stephen H. Brooks
Inventor:
Hector Derdeyn
By Joseph L. Atkins
Attorney

UNITED STATES PATENT OFFICE.

HECTOR DERDEYN, OF ROULERS, BELGIUM.

BELT-FASTENER.

SPECIFICATION forming part of Letters Patent No. 624,760, dated May 9, 1899.

Application filed June 4, 1898. Serial No. 682,560½. (No model.)

*To all whom it may concern:*

Be it known that I, HECTOR DERDEYN, a citizen of Belgium, residing in Roulers, Flanders, Kingdom of Belgium, have invented certain new and useful Improvements in Belt-Fasteners, (for which I have obtained a patent in Belgium, No. 131,691, which was asked for on the 6th of November, 1897, and was granted on the 15th of November, 1897,) of which the following is a specification, reference being had to the accompanying drawings.

The object of my invention is to produce an improved fastener for straps, such as pulley-belts and the like, whereby requisite tension upon the belt may be obtained and secured.

In belts as now joined it is almost impossible, even in the first instance, to stretch them properly, they being generally stretched too much or too little. When stretched too much, they heat the journals of the pulley-shafts, and when stretched too little they slide on the pulleys and do not work. Moreover, belts, particularly when new, even though they should be properly fitted at first, stretch in use and soon become too loose. All belts are affected more or less by humidity or dryness and become longer or shorter under changing conditions of atmosphere.

My invention is designed to afford means for regulating the tension on a belt at any time and with facility through the employment of the fastening mechanism that is permanently secured to and incorporated with the belt.

In the accompanying drawings, Figure I is a plan view of two ends of a belt united by my fastener. Fig. II is a side elevation of the same. Fig. III is a view of one of the fastening-plates detached.

Referring to the figures on the drawings, 1 indicates one end of a belt, and 2 the other end thereof. Each end is provided with a fastening-plate 3, opposite the face of which lies a clamping-plate 4. The plates 3 and 4, respectively, are provided with a series of alineing apertures 5 and 6, the number of the series depending somewhat upon the transverse extent of the belt, the number illustrated being three. Each of the series of apertures 5 and 6 are designed to receive a bolt or rivet 8, which passes through the end of the belt that is bent around the edge of the plate 3, as indicated at 9, so that only the surface of the belt is exposed to contact with the pulleys upon which the belt works.

The plates 3 are united by adjusting mechanism, preferably a plurality of right and left screws 10, two being shown in the drawings. These work in suitable threaded apertures 11, provided for them, respectively, in the plate 3. Each of the plates 3 is preferably formed with one or more bosses 12 for the accommodation of threaded aperture or apertures 11. It would be practicable, of course, to make the plates 3 sufficiently thick to afford, without bosses, an ample extent of threads within the apertures 11, but that is unnecessary, the bosses 12 answering every purpose in that respect.

14 indicates nut-like rings upon the screws 10, by which they may be operated.

I am aware that it is not new in belt-tighteners to employ plates adapted to be connected to the ends of the belt and united by right and left screws. Such devices, however, are neither intended nor adapted to be used upon a belt in practice. They are in no sense belt-fasteners, but only belt-tighteners. For that reason, when they have performed the office of drawing the ends of a belt together those ends must be fastened by other means, and before the belt can be used the tightener must be removed.

My device includes both a fastener and tightener in one that being once applied to the belt is always ready for use either for increasing or diminishing the tension upon it. The surface of the belt is, as by the bends 9, caused to make contact exclusively with the pulley to which it is applied.

What I claim is—

1. In a belt-fastener, the combination with a pair of fastening-plates or similar members, provided, respectively, with clamping-plates, and means for securing between them and the clamping-plates, respectively, the upturned ends of a belt, and one or more screws adjustably uniting the fastener-plates, substantially as set forth.

2. In a belt-fastener, the combination with a pair of plates, and means for fastening to each the upturned end of a belt so that the edge of each plate shall be covered by the bends in the belt formed by upturning its respective ends, and adjusting mechanism, independent of the means by which the plates are united to the ends of the belt, uniting said plates, substantially as set forth.

3. The combination with a pair of plates, of a belt having its ends united to said plates, respectively, and bent around the respective edges thereof, and adjusting mechanism uniting the plates, substantially as set forth.

HECTOR DERDEYN.

Witnesses:
A. BUERT,
D. PARDOU.